US012727547B2

(12) United States Patent
Carpenedo

(10) Patent No.: US 12,727,547 B2
(45) Date of Patent: Sep. 8, 2026

(54) RESIDUE CHOPPER AND SPREADER ARRANGEMENT

(71) Applicant: AGCO DO BRASIL SOLUÇÕES AGRÍCOLAS LTDA, Ribeireo Preto (BR)

(72) Inventor: Marcelo Carpenedo, Sapucaia do Sul (BR)

(73) Assignee: AGCO do Brasil Soluções Agr ícolas Ltda., Ribeiro Preto (BR)

( * ) Notice: Subject to any disclaimer, the term of this patent is extended or adjusted under 35 U.S.C. 154(b) by 346 days.

(21) Appl. No.: 18/512,422

(22) Filed: Nov. 17, 2023

(65) Prior Publication Data

US 2024/0215494 A1 Jul. 4, 2024

(30) Foreign Application Priority Data

Dec. 29, 2022 (GB) ..................................... 2219833

(51) Int. Cl.
*A01F 12/40* (2006.01)
*A01D 41/12* (2006.01)
*A01F 12/58* (2006.01)

(52) U.S. Cl.
CPC .......... *A01F 12/40* (2013.01); *A01D 41/1243* (2013.01); *A01F 12/58* (2013.01)

(58) Field of Classification Search
CPC ...... A01F 12/40; A01F 12/58; A01D 41/1243
See application file for complete search history.

(56) References Cited

U.S. PATENT DOCUMENTS

| | | | | |
|---|---|---|---|---|
| 2,708,582 A * | 5/1955 | Adams | A01F 12/40 | 239/650 |
| 6,079,643 A * | 6/2000 | Hoyle | A01C 17/008 | 239/681 |
| 6,769,980 B2 * | 8/2004 | Wolters | A01D 41/1243 | 460/112 |
| 7,186,179 B1 * | 3/2007 | Anderson | A01F 7/067 | 460/111 |
| 7,261,633 B2 | 8/2007 | Benes | | |
| 7,390,253 B2 * | 6/2008 | Farley | A01D 41/1243 | 460/111 |
| 2003/0109293 A1 | 6/2003 | Wolters | | |
| 2004/0127271 A1 * | 7/2004 | Wolters | A01D 41/1243 | 460/112 |
| 2006/0183519 A1 * | 8/2006 | Benes | A01D 41/1243 | 460/111 |
| 2016/0316623 A1 * | 11/2016 | Reinecke | A01D 41/1243 | |

(Continued)

FOREIGN PATENT DOCUMENTS

| | | | |
|---|---|---|---|
| CA | 2320521 A1 | 3/2002 | |
| CN | 205694309 U * | 11/2016 | A01D 41/1243 |

(Continued)

OTHER PUBLICATIONS

UK Intellectual Property Office, Search report for related UK Application No. GB2219833.7, dated Jun. 9, 2023, 3 pages.

*Primary Examiner* — Arpad Fabian-Kovacs

(57) ABSTRACT

A crop residue spreader arrangement comprises a frame, a pair of counter rotating residue spreader wheels carried from the frame, the frame element supporting first and second shaped residue deflectors wherein each of the first and second shaped residue deflectors comprises a plurality of vertically displaceable elements.

8 Claims, 7 Drawing Sheets

(56) References Cited

U.S. PATENT DOCUMENTS

| | | | | |
|---|---|---|---|---|
| 2024/0215482 | A1* | 7/2024 | Bojsen | A01D 41/1243 |
| 2024/0215484 | A1* | 7/2024 | Carpenedo | A01D 41/1243 |
| 2024/0237576 | A1* | 7/2024 | Isaac | A01D 41/1243 |
| 2024/0237577 | A1* | 7/2024 | Desmet | A01D 41/1243 |

FOREIGN PATENT DOCUMENTS

| | | | | | |
|---|---|---|---|---|---|
| DE | 102018131432 | A1 | * | 6/2020 | A01D 41/1243 |
| EP | 1031273 | A1 | * | 8/2000 | A01D 41/1243 |
| EP | 1985170 | A1 | * | 10/2008 | A01B 71/02 |
| EP | 2036422 | A2 | | 3/2009 | |
| EP | 3039956 | A1 | * | 7/2016 | A01D 41/1243 |
| EP | 3714675 | A1 | * | 9/2020 | A01F 7/067 |
| EP | 4000373 | A1 | * | 5/2022 | A01D 41/1243 |
| EP | 4008171 | A1 | * | 6/2022 | A01F 12/40 |
| GB | 2163032 | A | * | 2/1986 | A01C 17/00 |
| WO | 2018089796 | A1 | | 5/2018 | |
| WO | WO-2021099633 | A1 | * | 5/2021 | A01D 41/1243 |
| WO | WO-2021099634 | A1 | * | 5/2021 | A01D 41/1243 |

* cited by examiner

RESIDUE CHOPPER AND SPREADER ARRANGEMENT

FIELD

The present invention relates to agricultural harvesters such as combine harvesters, and, more particularly, to a crop residue spreader arrangement for spreading crop residue over the ground behind the agricultural harvester.

BACKGROUND

For many decades, self-propelled combine harvesters have been used by farmers to harvest a wide range of crops including cereals, maize and oil-seed rape. Typically, a combine harvester cuts the crop material, threshes the grain (or seed) therefrom, separates the grain from the straw, and cleans the grain before storing in an on-board tank. Straw and crop residue is ejected from the rear of the machine.

It is well known to fit combine harvesters with a cutting machine such as a straw chopper at the rear of the machine for chopping the straw ejected from the separating apparatus. Depending on the requirements of the farmer, the straw is either deposited directly onto the ground in windrows for subsequent baling and removal, or chopped and spread onto the field behind the combine for incorporation back into the soil. Means to direct the straw onto the ground typically comprises a tailboard or spreader arrangement incorporating a pair of counter rotating spreader wheels.

Variables such as the field's terrain, cutting height and wind direction can affect the final placement of the crop residue. Farmers want the spread width to be quickly and independently adjustable left to right whilst still maintaining an even distribution of straw and crop residue across the field.

It is an advantage of the present invention that consistent crop residue spreading is addressed. It is an object of the invention to provide even spread width together with side to side compensation without reducing the speed of the counter rotating spreader wheels.

BRIEF SUMMARY

According to a first aspect of the present invention, a crop residue spreader arrangement comprises a frame, a pair of counter rotating residue spreader wheels carried from the frame, the frame element supporting first and second shaped residue deflectors wherein each of the first and second shaped residue deflectors comprises a plurality of vertically displaceable elements.

Preferably, each of the plurality of vertically displaceable elements are mounted for movement between positions within a vertical channel.

Preferably, each of the vertical channels is mounted on the frame.

Preferably, each of the vertical channels is provided with one or more sets of guide wheels.

Preferably, each of the plurality of vertically displaceable elements is provided with an associated actuator to locate the vertically displaceable element vertically within the vertical channel.

Preferably, each actuator comprises one of a pneumatic actuator, a hydraulic actuator or a linear electric actuator.

Preferably, the plurality of vertically displaceable elements extend around a 90 degree arc.

According to a second aspect of the invention, an agricultural harvester comprises a chassis and a crop residue spreader arrangement according to the first aspect of the present invention carried by said chassis at a rear of the agricultural harvester.

Preferably, the agricultural harvester further comprises a driver's cab, a user terminal within the driver's cab and a control unit whereby each actuator can be operated from a driver's cab of the agricultural harvester utilising the user terminal.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Relative terms such as forward, rearward, transverse, lateral, longitudinal and sideways will be made with reference to the normal forward direction of travel of the combine 10 and indicated by arrow F represented in FIG. 1. The terms vertical and horizontal will be made with reference to the level ground 101 upon which the combine 10 is disposed. In other words the Cartesian axes of 'longitudinal', 'transverse', and 'vertical' are made in relation to the chassis 12 of combine 10 and are not affected by any slope in the ground. The terms "upstream" and "downstream" are made with reference of the general direction of crop flow along the material conveyance systems described.

Figure 1:
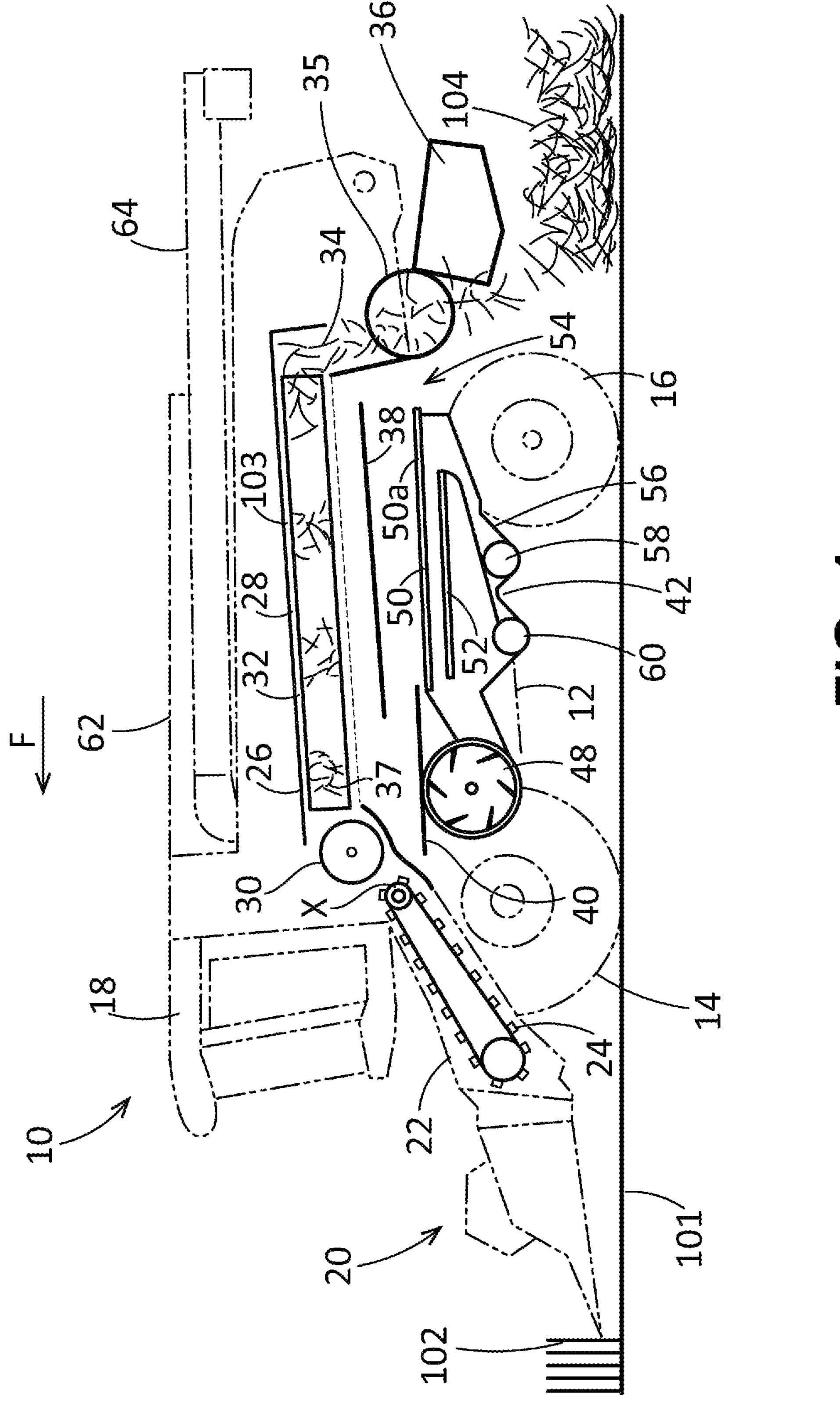
FIG. 1 shows a schematic side view of a known combine harvester comprising a residue spreader positioned after or downstream of a straw chopper.

FIG. 1 illustrates in schematic form the main components of the crop processing system of a combine harvester 10 and will be used to explain the flow of material below. The crop processing system is shown in solid lines whilst the outline profile of harvester 10 is shown in ghost form.

Combine harvester 10, hereinafter referred to as 'combine', includes a chassis 12 supported on front wheels 14 and rear steerable wheels 16 which engage the ground 101. A driver's cab 18 is also supported on the chassis 12 and houses a driver's station from where a driver controls the combine 10.

A cutting header 20 is detachably supported on the front of a feeder house 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feeder house 22. An elevator 24, normally in the form of a chain and slat conveyor or elevator as shown, is housed within the feeder house 22 and serves to convey the crop material stream upwardly and rearwardly from the header 20 to the crop processor designated generally at 26. At this stage the crop material stream is unprocessed.

The crop processor 26 of the illustrated combine 10 includes a pair of axial flow threshing and separating rotors 28 fed by a tangential flow, crop material impelling, feed beater 30. It should be appreciated however that alternative types of crop processor may be used without deviating from the scope of the invention. For example, the crop processor may instead include a conventional tangential flow threshing cylinder with a plurality of straw walkers for separation. Alternatively, a single axial-flow processing rotor may be employed.

Turning back to FIG. 1, the feed beater 30 rotates on a transverse axis and comprises crop engaging deflectors (not shown) which convey the crop material stream under the beater and into rotor housings 32 which each house one of said rotors 28. It should be appreciated that only the left-hand rotor 28 and housing 32 is shown in FIG. 1 whereas the right-hand equivalent is hidden from view.

The rotors 28 are positioned to have a generally longitudinal, or fore and aft, rotation axis which is normally inclined upwardly towards the rear of the combine 10.

Flighting elements (not shown) provided on the front end of each rotor 28 engage the crop material stream which is then conveyed as a ribbon or mat 103 in a generally rearward axial and helical path in the space between the rotor 28 and the rotor housing 32.

The axial flow rotors 28 serve to thresh the crop stream in a front region, separate the grain therefrom in a rear region, and eject the straw residue via a straw discharge chute 34 provided below a rear portion of the rotors 28, the straw falling either directly onto the ground in a windrow, or via a straw chopper 35 and straw spreader 36 to be described in more detail later.

A part-cylindrical grate 37 provided in the underside of each rotor housing 32 allows the separated material to fall by gravity onto either a return pan 38 located below a rear section of the processor 26, or directly onto a stratification pan 40 located below a front section of the processor 26. In reality the separated material falling through the grate 37 is typically a mix of grain and material other than grain (MOG) which may include chaff, tailings and some straw.

The return pan 38 and stratification pan 40 together serve as a material conveyance system arranged to convey the separated crop material to a grain cleaning shoe designated generally at 42. The pans 38,40 each include a respective linkage (not shown) to convert a torque source into oscillating motion to oscillate the pans in a generally fore and aft direction. Combined with a transversely rippled or corrugated floor, the oscillating movement of the return pan 38 and stratification pan 40 propels the material generally forwardly or rearwardly respectively.

The return pan 38 "returns" the separated material incident thereon towards the front of the combine 10 (in the direction F) to a front discharge edge 44 from where the material falls or cascades onto the stratification pan 40. The material on the stratification pan 40 is conveyed rearwardly to a rear discharge edge 46 from where the material falls into the cleaning system or "shoe" 42.

The grain-MOG mix falls from the rear discharge edge 46 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material (mostly chaff) passes to the end of the chaffer and out of the rear of the machine at shoe outlet 54. A rear section of chaffer 50*a* is commonly independently adjustable and is configurable to allow tailings to pass there through into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling there through is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

Figure 2:
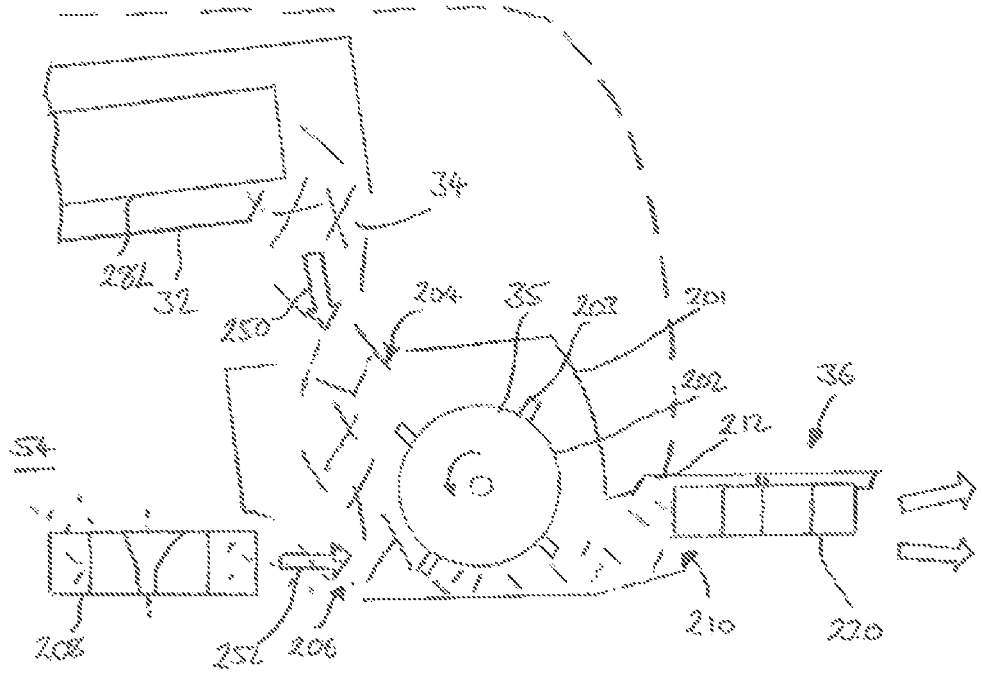
FIG. 2 shows an enlarged schematic side view of a residue handling system located at the rear of a combine harvester in accordance with an embodiment; a schematic side view of a round baler and a towing vehicle.

Aspects of the invention relate to the handling of the crop residue ejected by the straw chopper 35 and in particular to the straw spreader 36. FIG. 2 shows the passage of straw dropped by the processing rotors 28 and of the chaff from the shoe outlet 54.

The straw chopper 35 has a housing 201 inside which a chopper drum 202 is journaled for rotation on a transverse axis. The chopper drum 202 has sets of knives 203 pivotally mounted to the circumferential surface, the knives 203 interacting with stationary knives (not shown) to chop the material. An upper part of the housing 201 is formed with a first inlet 204 for reception of threshed crop residue (usually and mostly straw) falling from the rear of crop processing rotors 28L, 28R, indicated by arrow 250. Whilst it should be appreciated that only the left-hand rotor 28L can be seen in FIG. 2, both rotors 28L, 28R can be viewed from above in FIG. 3.

A front region of the housing 201 is optionally provided with a second inlet 206 for reception of chaff either directly from the shoe outlet 54 or via a chaff spreader 208 as is known in the art, for example as disclosed in U.S. Pat. No.

6,908,379. The movement of chaff from chaff spreader 208 through the second inlet 206 is indicated by arrow 252.

The residue entering the housing 201 is conveyed tangentially around and under the chopper drum 202, is chopped by the knives 203, and is expelled through an elongate transverse outlet 210 provided in a rear lower region of the housing 201.

The residue is directed from the transverse outlet 210 to a crop residue spreader arrangement 36. The crop residue spreader arrangement 36 comprises counter rotating left and right hand residue spreader wheels 220,222, with each residue spreader wheel having an associated shaped residue deflector 230,232. The residue spreader wheels 220,222 are supported on a frame 302. The frame 302 is connected to the chassis 12 in any suitable manner.

Each residue spreader wheel 220,222 comprises a driven rotatable vane mounted in a housing 304. The vane has a number of arms in the form of paddles 300 adapted for rotation about a central generally vertical axis. The housing 304 provides an inlet whereby chopped residue is introduced to the residue spreader wheel 220,222 and an outlet from which the chopped residue is directed in a generally rearward direction of flow out behind the combine harvester 10 on to the ground 101. First and second residue deflectors 230,232 are mounted on the frame 302 adjacent the respective residue spreader outlets. Each of the first and second residue deflectors 230, 232 comprises a plurality of individually vertically displaceable elements 310.

Each of the vertically displaceable elements 310 is mounted for movement between positions within a vertical channel 312. Each channel 312 is mounted on a subsidiary portion 314 of the frame 302 adjacent an upper lip of the associated residue spreader wheel 220,222.

Each subsidiary frame portion 314 corresponds. Each subsidiary frame portion 314 comprises a curved member 316 to which the vertical channels 312 are secured. The curved member 316 is provided with supports which connect the curved member 316 to the frame 302. Conveniently two such supports 318,320 are provided. The curved member 316 conveniently extends around a 90 degree arc.

In the illustrated embodiment of FIGS. 3 to 6, five vertical channels 312 are provided. However, other numbers of channels may be provided. Fewer channels will limit the ability to alter the desired shape of the overall residue deflector. A greater number of channels will add to the complexity of the design.

Conveniently, each vertically displaceable element 310 is guided within its vertical guide channel 312 by one or more sets of guide rollers 322. The guide rollers 322 may conveniently be mounted on bearings adjacent the vertical guide channel 312.

Movement of the vertically displaceable elements 310 may be achieved in any suitable manner. For example each vertically displaceable element 310 may be mechanically secured in position. If a different configuration of the residue deflector is desired, each vertically displaceable element 310 can be released, adjusted and then secured in the desired position. However, in this construction, changing between desired spreading profiles can remain time consuming, though does not require the operator to carry a supply of differently shaped residue deflectors either in storage or with the harvester.

In the illustrated example, each vertically displaceable element 310 is mounted on a suitable actuator 324, for example a hydraulic or pneumatic actuator. In the illustrated embodiment, a linear electric actuator is used. In this way vertical adjustment of each vertically displaceable element 310 may be achieved in a timely manner.

Alternatively, two or more vertically displaceable elements 310 may be associated with a single actuator 324. However, it will be understood that this will limit the flexibility in providing a desired profile for the residue deflector.

The actuators 324 are individually controlled. Control may be by way of manual or automated control. For example an operator may control the position of each vertically displaceable element 310 to determine a desired profile by use of a user terminal 332 within the driver's cab 18 of the harvester 10. The operator may choose to define the position of each vertically displaceable element 310 to determine a desired residue deflector profile or select from a menu of preprogrammed residue deflector profiles which will enable automated positioning of the vertically displaceable elements 310 to create the desired residue deflector profile. In each case signals from the user terminal 332 are received by an electronic control unit 334 by way of a suitable electronic communication network 336. The electronic control unit 334 analyses these signals and generates suitable output signals that are sent to the actuators 310 over the electronic communications network 336 in order to control the position of the vertically displaceable elements 310.

By adjusting the vertical position of each of the vertically displaceable elements 310 a desired residue deflector profile may be obtained that best suits the desired spreading characteristic for each harvesting situation.

Figure 3:
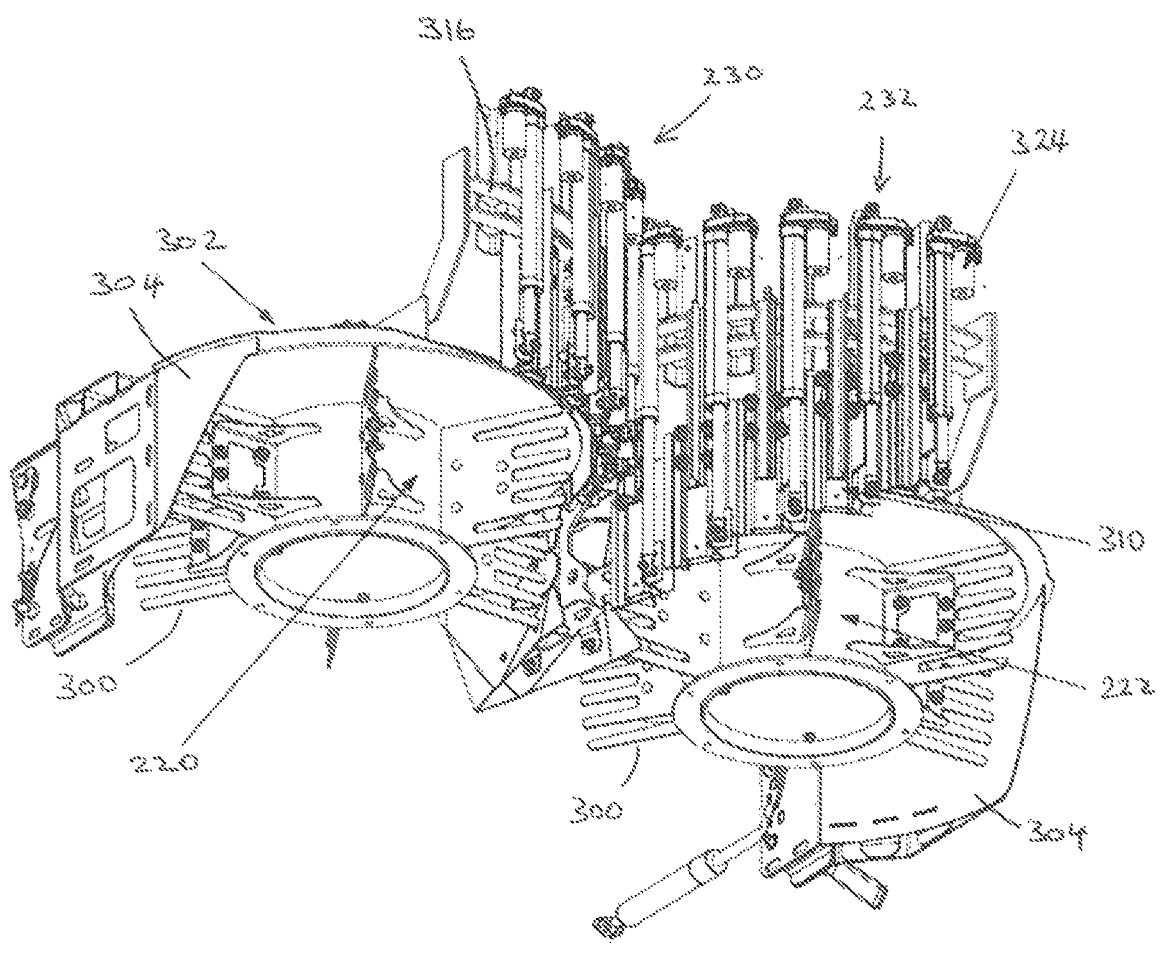
FIG. 3 shows a first perspective view of a crop residue spreader arrangement according to the present invention.
Figure 4:
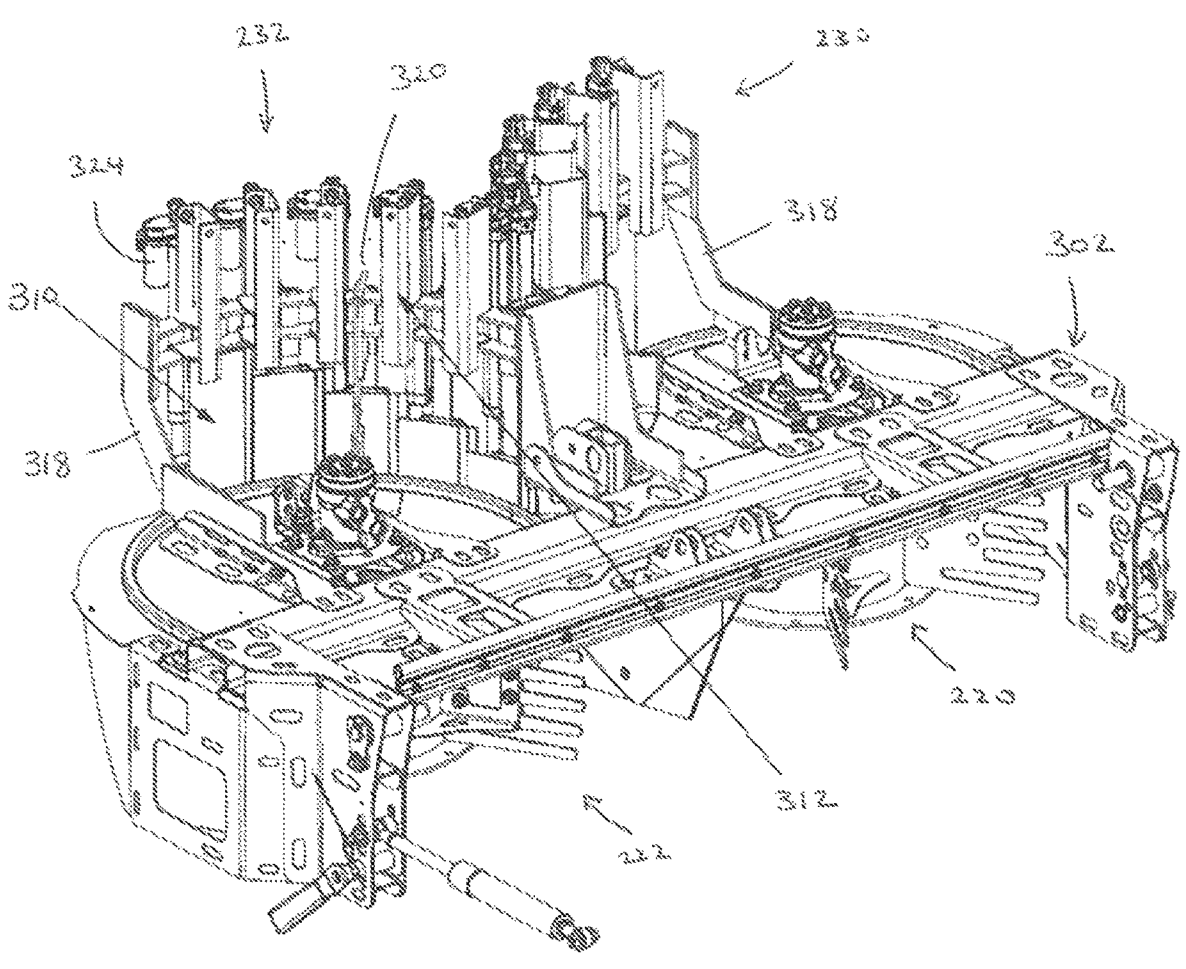
FIG. 4 shows a second perspective view of a crop residue spreader arrangement according to the present invention.
Figures 5, 6:
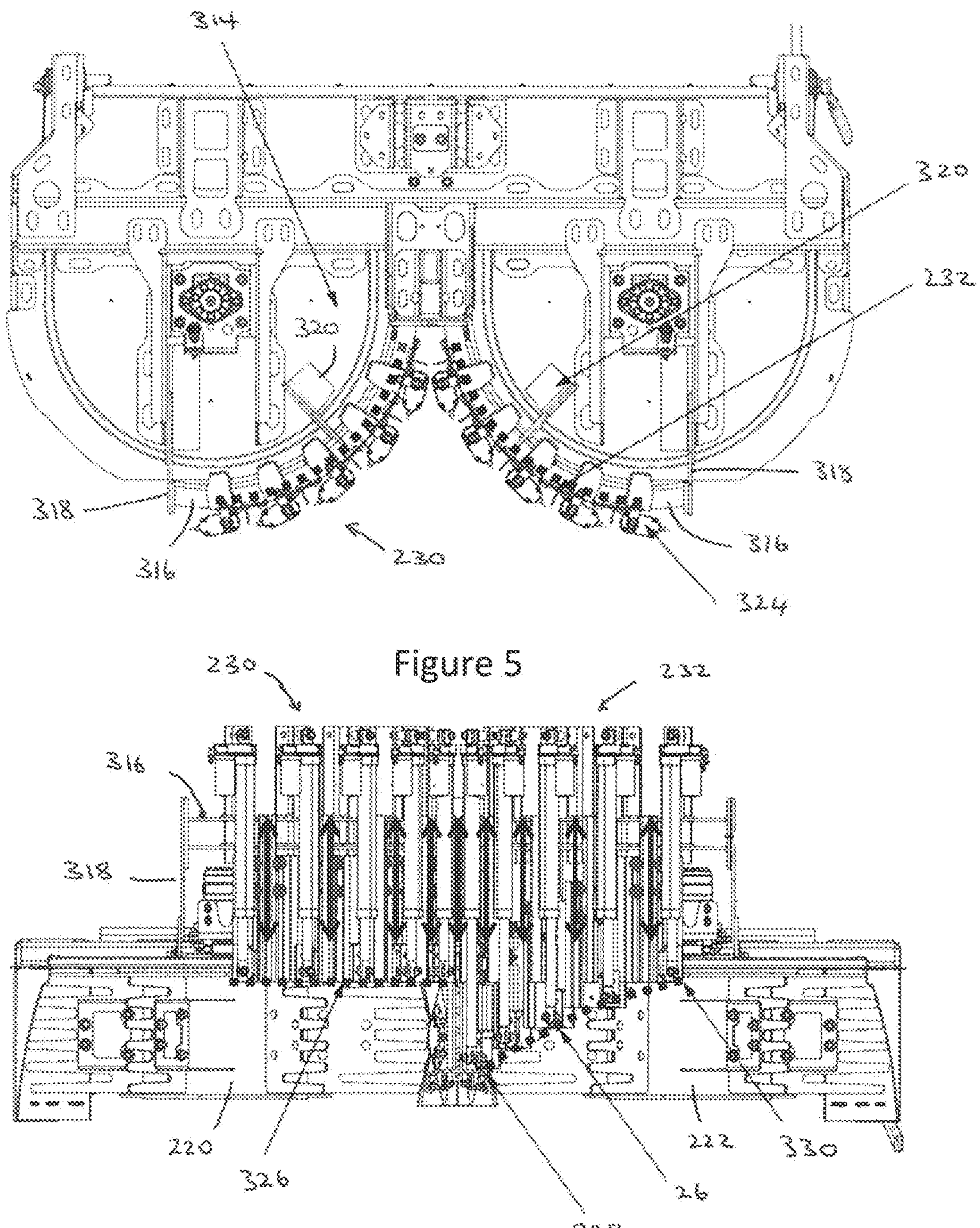
FIG. 5 shows a plan view of the crop residue spreader arrangement of FIG. 3.
FIG. 6 shows an end view of the crop residue spreader arrangement of FIG. 3.
Figure 7:
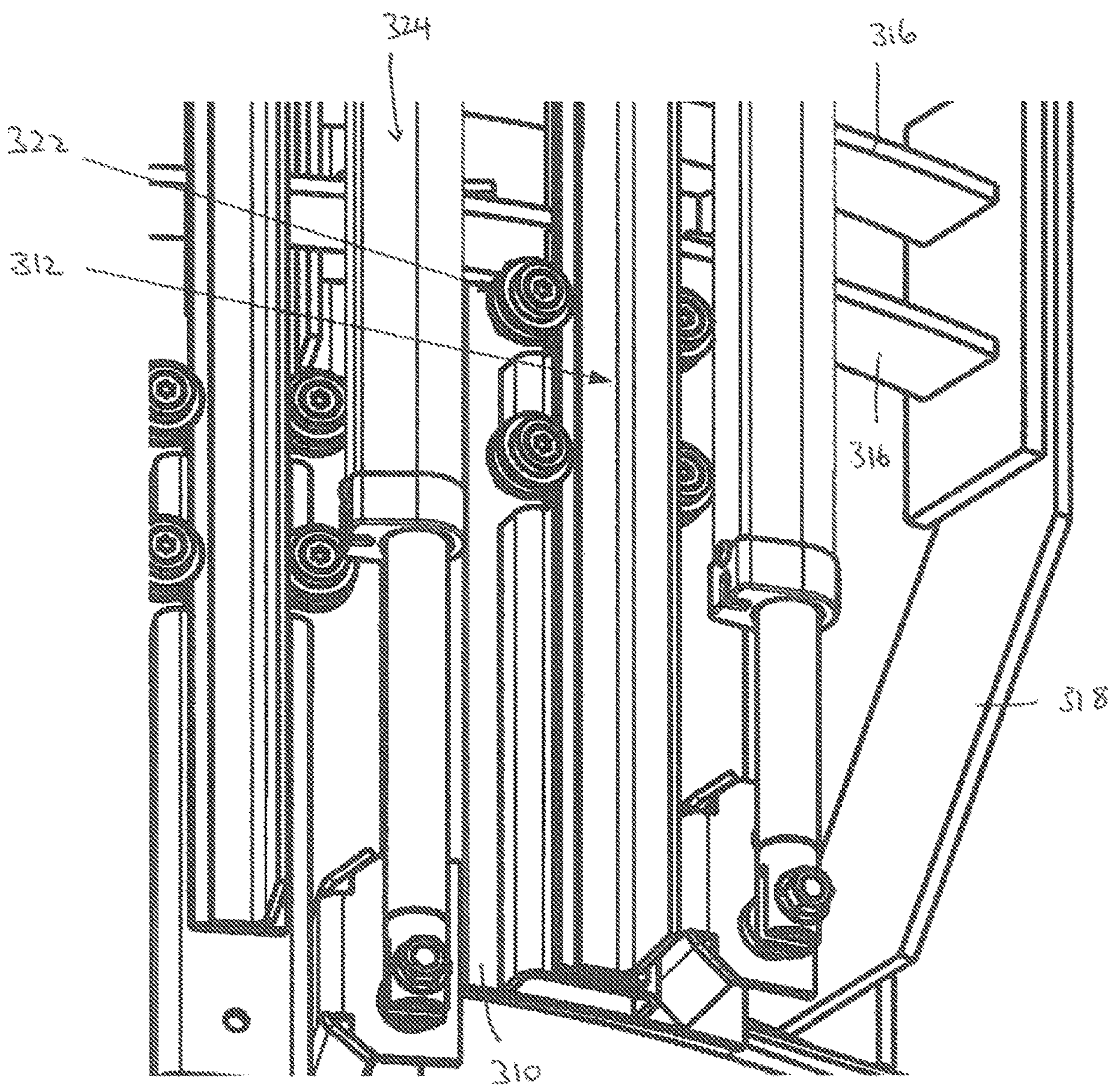
FIG. 7 shows a detail of vertically displaceable elements forming part of a residue deflector.
Figure 8:
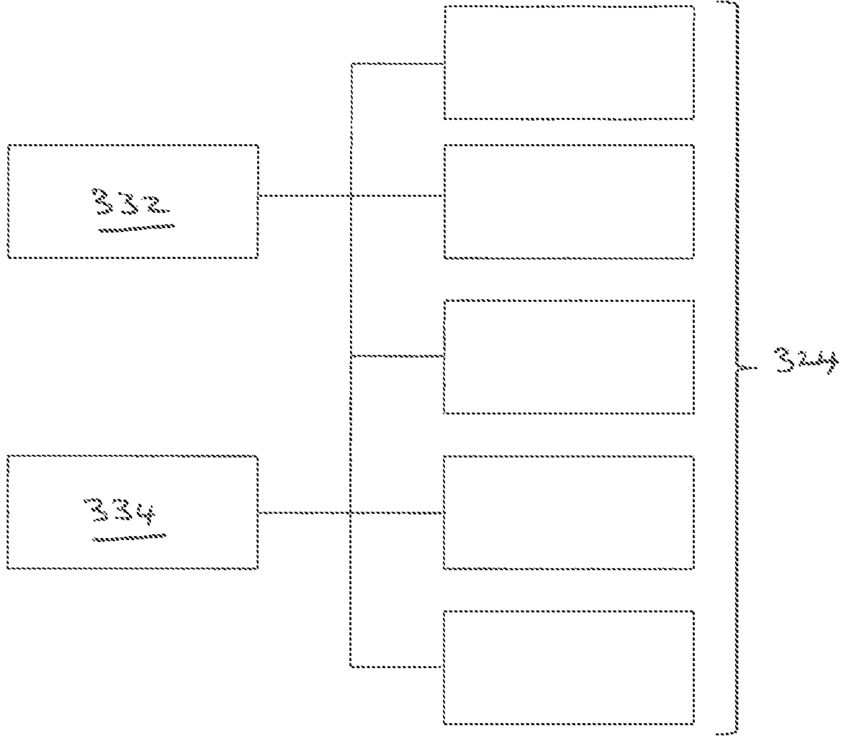
FIG. 8 shows a schematic diagram illustrating electrical components of a control system for the crop residue spreader arrangement.

The left-hand sides of FIGS. 3, 5 and 6 show the vertically displaceable elements 310 in a neutral position in which a lower edge 326 of the left-hand residue deflector is raised above the residue spreader outlet. In other words the left-hand residue deflector has a horizontal profile level with the upper lip of the residue spreader outlet.

The right-hand side of FIGS. 3, 5 and 6 show the vertically displaceable elements 310 displaced so as to provide a gradient profile to the lower edge 326 of the right-hand residue deflector, which is more closed at the beginning 328 of material discharge and more open at the end 330 of material discharge.

By providing automated control of the actuators 324, the shapes of the respective residue deflectors 230,232 may be dynamically controlled and changed at any time during the harvesting process.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of combine harvesters and component parts therefore and which may be used instead of or in addition to features already described herein.

What is claimed is:

1. A crop residue spreader arrangement comprises a frame, a pair of counter rotating residue spreader wheels carried from the frame, the frame element supporting first and second shaped residue deflectors wherein each of the first and second shaped residue deflectors comprises a plurality of vertically displaceable elements, wherein each of the plurality of vertically displaceable elements are mounted for movement between positions within a vertical channel.

2. A crop residue spreader arrangement according to claim 1, wherein each of the vertical channels is mounted on the frame.

3. A crop residue spreader arrangement according to claim 1, wherein each of the vertical channels is provided with one or more sets of guide wheels.

4. A crop residue spreader arrangement according to claim 1, wherein each of the plurality of vertically displaceable elements is provided with an associated actuator to locate the vertically displaceable element vertically within the vertical channel.

5. A crop residue spreader arrangement according to claim 4, wherein each actuator comprises one of a pneumatic actuator, a hydraulic actuator or a linear electric actuator.

6. A crop residue spreader arrangement according to claim 1, wherein the plurality of vertically displaceable elements extend around a 90 degree arc.

7. An agricultural harvester comprising a chassis and a crop residue spreader arrangement according to claim 1 carried by said chassis at a rear of the agricultural harvester.

8. An agricultural harvester according to claim 7, wherein the agricultural harvester further comprises a driver's cab, a user terminal within the driver's cab and a control unit whereby each actuator can be operated from a driver's cab of the agricultural harvester utilising the user terminal.

* * * * *